(12) United States Patent
Nie

(10) Patent No.: US 11,704,222 B2
(45) Date of Patent: Jul. 18, 2023

(54) EVENT LOG PROCESSING

(71) Applicant: KONINKLIJKE PHILIPS N.V., Eindhoven (NL)

(72) Inventor: Hongchao Nie, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 810 days.

(21) Appl. No.: 16/582,526

(22) Filed: Sep. 25, 2019

(65) Prior Publication Data

US 2020/0104234 A1 Apr. 2, 2020

(30) Foreign Application Priority Data

Sep. 27, 2018 (EP) .................................... 18197044

(51) Int. Cl.
| | | |
|---|---|---|
| *G06F 11/00* | (2006.01) | |
| *G06F 11/34* | (2006.01) | |
| *G06F 11/07* | (2006.01) | |
| *G06F 11/30* | (2006.01) | |

(52) U.S. Cl.
CPC .......... *G06F 11/3476* (2013.01); *G06F 11/07* (2013.01); *G06F 11/3013* (2013.01); *G06F 11/3452* (2013.01)

(58) Field of Classification Search
CPC ................ G06F 11/3476; G06F 11/07; G06F 11/3013; G06F 11/3452; G06F 11/0781; G06F 11/3051; G06F 11/3065; G06F 11/3072; G06F 11/3082
See application file for complete search history.

(56) References Cited

U.S. PATENT DOCUMENTS

| | | | |
|---|---|---|---|
| 10,505,825 B1* | 12/2019 | Bettaiah | G06F 16/24578 |
| 10,956,296 B2* | 3/2021 | Puri | G06F 11/3476 |
| 2008/0306930 A1 | 12/2008 | Diederiks et al. | |
| 2011/0185234 A1 | 7/2011 | Cohen et al. | |
| 2014/0115002 A1 | 4/2014 | Kocher et al. | |
| 2014/0297317 A1 | 10/2014 | Hu et al. | |
| 2016/0098304 A1 | 4/2016 | Rosier | |
| 2017/0220663 A1 | 8/2017 | Zhao et al. | |
| 2018/0102938 A1* | 4/2018 | Yoon | G06F 16/358 |
| 2018/0113780 A1 | 4/2018 | Kim | |
| 2019/0034517 A1* | 1/2019 | Byrd | G06F 17/40 |

(Continued)

OTHER PUBLICATIONS

Al-Mubaid, H. et al., "A cluster-based approach for semantic similarity in the biomedical domain". Proceedings of the 28th IEEE EMBS Annual International Conference, NYC, Aug. 30-Sep. 3, 2006.

(Continued)

*Primary Examiner* — Joseph D Manoskey

(57) ABSTRACT

Presented are concepts for processing an event log. Once such concept obtains an event log comprising a log of event occurrences for an executed process. It also obtains an events embedding model representative of relationships between a plurality of events of one or more processes. Based on the events embedding model, repeating events in the event log are clustered into one or more groups, and each of the one or more groups are associated with a respective identifier. Repeating events in the event log are then replaced with the identifier associated with the group that the repeating event is a member of.

12 Claims, 4 Drawing Sheets

(56) References Cited

U.S. PATENT DOCUMENTS

2019/0354457 A1* 11/2019 Urmanov .............. G06F 16/353

OTHER PUBLICATIONS

Alharbi, A. et al., "Improving pattern detection in healthcare process mining using an interval-based event selection method". Business Process Management Forum, Lecture Notes in Business Information Processing. Presented at the International Conference on Business Process Management, Springer, Cham, pp. 88-105, 2017.

Heba, A. et al., "Dejavu: An accurate energy-efficient outdoor localization system", Proceedings of the 21st ACM Sigspatial International Conference on Advances in Geographic Information Systems, Sigspatial '13, Jan. 1, 2013, pp. 154-163.

* cited by examiner

EVENT LOG PROCESSING

FIELD OF THE INVENTION

This invention relates generally to data processing and analysis, and more particularly to processing an event log.

BACKGROUND OF THE INVENTION

An event log is a resource that provides information about event occurrences. An event log typically comprises a record (or log) of event occurrences for an executed process. For each event occurrence, an associated entry in the event log may be provided along with associated information or data relating to the event occurrence.

It is known to use event logs in order to analyze processes. For example, process mining aims to construct one or more process models from event data, some of which may be provided by an event log.

A problem associated with using event logs is that of repeating events (e.g. resulting from periodic monitoring). Repeating events may obfuscate process patterns, for example due to their high occurrence and/or repetitive nature in an event log. However, some repetitive process events (which demand consequence actions for example) may affect a flow of a process. They may also have different meanings in different context. Accordingly, it may be beneficial to maintain information regarding repeating events but reduce redundancy.

An existing approach that attempts to cater for repeating events employs a concept of refining event labels based on context. More specifically, such an approach distinguishes between events near the start of a process and events near the end of the process end. However, this approach is not suitable for large-scale data use (i.e. it exhibits poor scalability)

SUMMARY OF THE INVENTION

The invention aims to at least partly fulfil the aforementioned needs. To this end, the invention provides methods and systems as defined in the independent claims. The dependent claims provide advantageous embodiments.

There is provided a method of processing an event log, the method comprising: obtaining an event log, the event log comprising a log of event occurrences for an executed process; identifying repeating events in the event log; obtaining an events embedding model representative of relationships between a plurality of events of one or more processes; based on the events embedding model, clustering the repeating events into one or more groups, each group comprising at least one of the identified repeating events; associating each of the one or more groups with a respective identifier; and for each identified repeating event in the event log, replacing the repeating event in the event log with the identifier associated with the group that the repeating event is a member of.

Proposed is a concept for processing an event log so that repeating events are less obfuscating but information regarding process structure and/or event contexts is maintained. By processing an event log with such a concept, a refined or improved version of the event log may be obtained which assists or facilitates process mining.

Embodiments may therefore help to avoid or reduce a negative impact of repeating events in an event log. Embodiments may also help to improve (i.e. increase) throughput of process mining by avoiding the need to undertake complex or difficult analysis of a process that comprises numerous repeating events.

Embodiments may be based on a proposal to employ a model representative of relationships between a plurality of events of one or more processes. Such a model may be built using conventional machine learning and/or data processing techniques, thus leveraging historical data and/or established knowledge to improve the accuracy of determinations provided by proposed embodiments. By way of further example, a model employed by an embodiment may map words (representing events) to vectors in a lower-dimension space. As a result, a one-hot word with size N×1 (where N is the number of words in vocabulary) like [0, 0, . . . , 1, 0, . . . , 0] may be mapped to a vector in the embedding space like [0.2, 0.5, 0.1, . . . , a0.3] with size M×1, where M is the dimension of the embedding space. Embedding may thus be applied to events recorded during a workflow execution.

Improved (e.g. easier or more accurate) process analysis (or mining) may therefore be facilitated by proposed embodiments. Embodiments may also be employed to improve the efficiency of process analysis, thereby potentially providing time reductions and/or cost savings.

Proposed embodiments may therefore be of particular relevance to data science platforms or informatics solutions equipped with process analysis capabilities. Also, embodiments may be relevant to processing healthcare event log data, especially where the medical context of an event of a medical process may be important or of interest for example.

Embodiments may be based on a proposal to represent a sequence of event occurrences for an executed process as a (process) string. For instance, in some proposed embodiments, obtaining an event log may comprise generating a process string, wherein events occurrences are represented as words, and wherein the ordering of the words in the string is representative of the order of the event occurrences. This may provide a simple way to represent a process and the order in which events of the process occurred. Further, a string may be simple and quick to process, thus alleviating resource/hardware requirements.

By way of example, an event log of a process with events A, B, C, D, and E may be generated as a sentence [A B C D E]. In this way, a dataset of a plurality of event logs may be represented as N sentences, where N is the number of different process traces.

Further, identifying repeating events in the log may comprise adding a sequence identifier to each of the words representing the identified repeating events, wherein a sequence identifier is representative of a position in an occurrence sequence. Thus, referring to the example in the preceding paragraph, repeating events may be renamed as different events that identified with their occurrence sequence, e.g., B to B1, B2, B3 . . . . Thus, an exemplary sentence such as [A B C B D E B] may be represented as [A B1 C B2 D E B3]. This provides an approach to providing information about event ordering whilst maintain contextual information for each repeating event.

In an embodiment, clustering the identified repeating events into one or more groups may comprise: clustering the identified repeating events into a plurality of groups; analyzing the plurality of groups to identify an outlier to the plurality of groups; and removing the identified outlier from the plurality of groups.

Also, analyzing the plurality of groups to identify an outlier to the plurality of groups may comprise: comparing the number of members of a group with a threshold value; and identifying the group as an outlier based on comparison result. For example, repeating events of B can be clustered as two groups: {B1, B2}; and {B3}, and the group with a number of events below a predetermined threshold may be dropped. For example, if a group only has one event, it may be dropped (thus resulting in the group {B3} being removed in the aforementioned example). Removal of outliers may result in more accurate process results by removing the influence of rouge, unusual or uncharacteristic event occurrences.

In an embodiment, the one or more processes may comprise the executed process. The model may therefore be representative of relationships between a plurality of events of the executed process. For instance, the model may be generated based on previous executions of the process. Such use of historical or learned information relating to the executer process may improve an accuracy of the obtained model (and determinations made by embodiments).

By way of further example, the events embedding model may comprise a vector representation of relationships between a plurality of events. Clustering the repeating events into one or more groups may then comprise: determining distances between the repeating events in the vector representation; and clustering the repeating events into one or more groups based on the determined distances. Conventional clustering techniques may be employed by proposed embodiments. For example, a K-means algorithm may be employed such that k-clusters (e.g. manually defined) are identified by locating centroids and calculating distance from individual data points. Such conventional clustering approaches are widely known in the field of data processing, and so it will be understood that proposed embodiments may employ any such clustering concepts.

Embodiments may further comprise the step of generating an output signal based on the modified event log (i.e. the new version of the event log obtained after replacing the repeating events in the event log with identifiers in accordance with a proposed embodiment). The output signal may thus be provided to a user or data analysis apparatus for the purpose of data analysis or processing for example.

According to yet another aspect of the invention, there is provided computer program product for processing an event log, wherein the computer program product comprises a computer-readable storage medium having computer-readable program code embodied therewith, the computer-readable program code configured to perform all of the steps of an embodiment.

A computer system may be provided which comprises: a computer program product according to an embodiment; and one or more processors adapted to perform a method according to an embodiment by execution of the computer-readable program code of said computer program product.

In a further aspect, the invention relates to a computer-readable non-transitory storage medium comprising instructions which, when executed by a processing device, execute the steps of the method for processing an event log according to an embodiment.

According to another aspect of the invention, there is provided a system for processing an event log, the system comprising: an interface component adapted to obtain an event log, the event log comprising a log of event occurrences for an executed process; an identification component adapted to identify repeating events in the event log; a modelling component adapted to obtain an events embedding model representative of relationships between a plurality of events of one or more processes; a clustering component based on the events embedding model, clustering the repeating events into one or more groups, each group comprising at least one of the identified repeating events; an association component associating each of the one or more groups with a respective identifier; and a log editor adapted to, for each identified repeating event in the event log, replace the repeating event in the event log with the identifier associated with the group that the repeating event is a member of.

It will be appreciated that all or part of a proposed system may comprise one or more data processors. For example, the system may be implemented using a single processor which is adapted to undertake data processing in order to process an event log.

The system for processing an event log may be remotely located from the executed process, and event log data may be communicated to the system unit via a communication link.

The system may comprise: a server device comprising the interface component, identification component, modelling component, clustering component and association component; and a client device comprising the log editor. Dedicated data processing means may therefore be employed for the purpose of identifying and clustering repeating events, thus reducing processing requirements or capabilities of other components or devices of the system.

The system may further comprise a client device, wherein the client device comprises the interface component, identification component, modelling component, clustering component, association component, and log editor. In other words, a user (such as a process analyst) may have an appropriately arranged client device (such as a laptop, tablet computer, mobile phone, PDA, etc.) which processes received event log data for processing in accordance with an embodiment.

Thus, event log processing may be hosted at a different location from where the process is executed. For example, for reasons of computing efficiency it might be advantageous to execute only part of the event log processing at the process execution location, thereby reducing associated costs, processing power, transmission requirements, etc.

Thus, it will be understood that processing capabilities may therefore be distributed throughout the system in different ways according to predetermined constraints and/or availability of processing resources.

Embodiments may also enable some of the processing load to be distributed throughout the system. For example, pre-processing may be undertaken at a process execution system. Alternatively, or additionally, processing could be undertaken at a communication gateway. In some embodiments, processing may be undertaken at a remote gateway or sever, thus relinquishing processing requirements from an end-user or output device. Such distribution of processing and/or hardware may allow for improved maintenance abilities (e.g. by centralizing complex or expensive hardware in a preferred location). It may also enable computational load and/or traffic to be designed or located within a networked system according to the processing capabilities available. A preferable approach may be to pre-process event log data locally and transmit extracted data for full processing at a remote server.

Embodiments may be implemented in conjunction with pre-existing, pre-installed or otherwise separately-provisioned event log processing apparatus, and signals or data from such apparatus may be received and processed in accordance with proposed concepts. Other embodiments may be provided with (e.g. integrated into) event logging apparatus.

These and other aspects of the invention will be apparent from and elucidated with reference to the embodiment(s) described hereinafter.

BRIEF DESCRIPTION OF THE DRAWINGS

Examples in accordance with aspects of the invention will now be described in detail with reference to the accompanying drawings, in which.

DETAILED DESCRIPTION OF THE EMBODIMENTS

Figure 1:
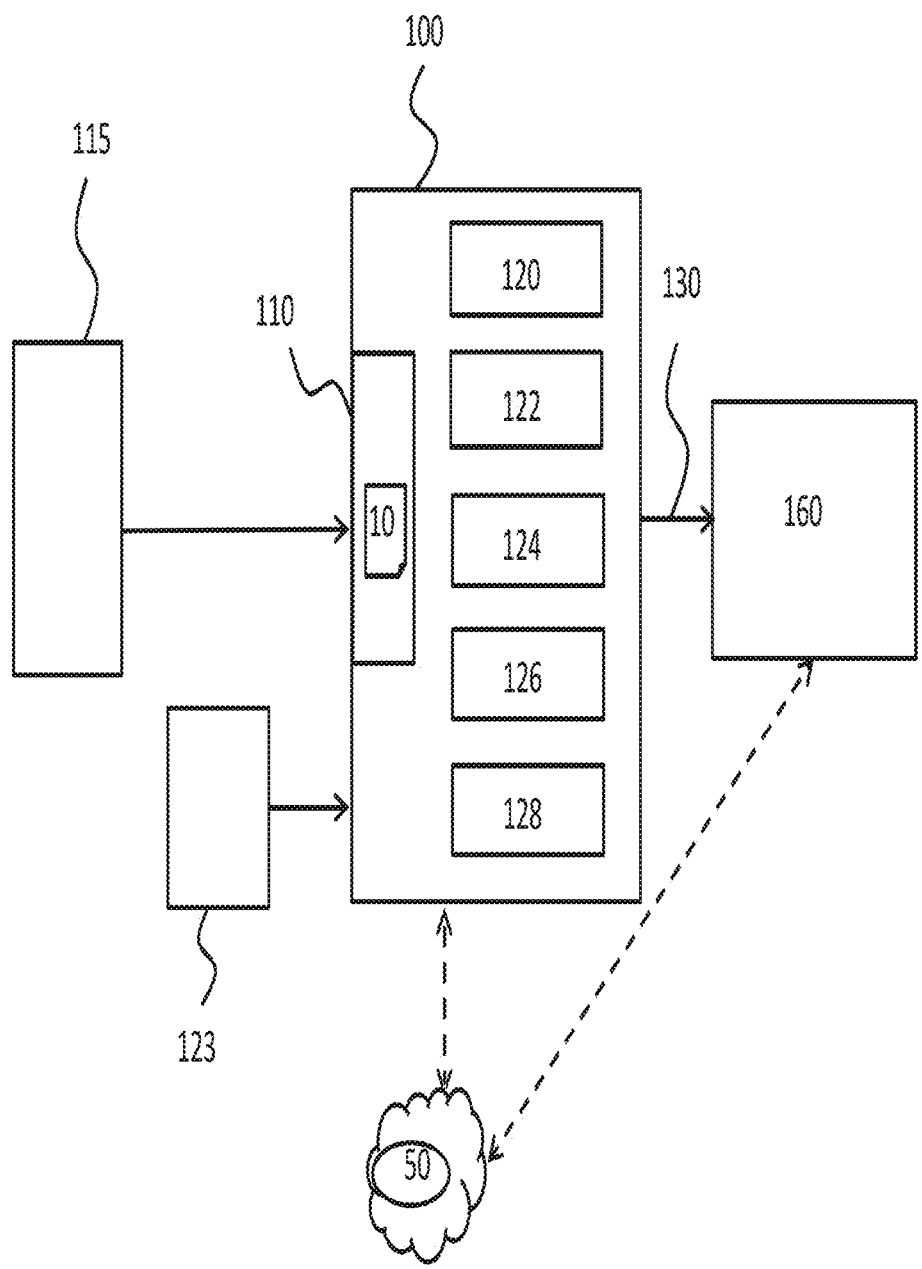
FIG. 1 is a simplified block diagram of a system for processing an event log according to an embodiment.

Proposed is a concept for processing an event log that may maintain information about repeating events but reduce redundancy of the repeated events in the event log. This may help process analysis by reducing the amount by which repeating events in the event log may obfuscate main process patterns. It may, for example, help to refine event logs so that they are more meaningful or easier to analyze.

To enable the replacement of repeating events in an event log with more useful identifiers for example, repeating events of the event log may be clustered into groups. An identifier associated with a group may then be used to replace instances of the group's members in the event log, thus maintaining information about the repeating events in the event lot but removing redundant or repeated information.

Clustering of the repeating events into groups may be based on an event embedding model that is representative of relationships between events for various processes (such as processes that are similar to, or the same as, the process for which the event log was created). Use of an event embedding model may enable relationships between events (based on established or learnt information about the process or similar processes) to be leveraged. Such a model may be developed based on traditional data or event processing and machine-learning techniques for improved accuracy.

An event embedding model may map words to vectors in a lower-dimension space. As a result, a vocabulary with size N×1 (where N is the number of words in vocabulary) like [0, 0, . . . , 1, 0, . . . , 0] may be mapped to a vector in the embedding space like [0.2, 0.5, 0.1, . . . , 0.3] with size M×1, where M is the dimension of the embedding space. The vectors can be graphically plotted to provide a visual representation of their relative distances between each other. With such vectors, relationships between events can be inferred from their relative locations (e.g. distances). For example, events separated by distance less than a threshold amount in a vector representation may be related and thus clustered into a group.

Embodiments may, for example, be useful for improving analysis, assessment and/or design of processes, including medical or clinical procedures.

Illustrative embodiments may thus be utilized in many different types of process analysis apparatus and/or medical process facilities.

By way of example, process mining or analysis may be useful when designing or refining a process. Using a proposed embodiment, a user may, for example, obtain an improved version of an event log which is easier to analyze (e.g. because redundant information has been reduced or removed).

In order to provide a context for the description of elements and functionality of the illustrative embodiments, the Figures are provided hereafter as examples of how aspects of the illustrative embodiments may be implemented. It should therefore be appreciated the Figures are only examples and are not intended to assert or imply any limitation with regard to the environments, systems or methods in which aspects or embodiments of the present invention may be implemented.

Embodiments of the present invention are directed toward reducing the redundancy of repeated events in an event log. This may be useful for improving process analysis, e.g. by reducing an amount by which repeating events obfuscate/hide process patterns.

Embodiments may employ conventional machine-learning and data processing to build events embedding models for identifying relationships between events of a process. Based on training data (e.g. historical data. previously-established results and/or previous observations), event selection and cross-validation learning schemes may be employed to generate the events embedding models.

By determining a measure of similarity or distance between repeating events based on an events embedding model, embodiments may cluster or group repeating events. Group repeating events may then be replaced with a group identifier in the event log. This may help to reduce a number of redundant or misleading events entries in the event log. Thus, embodiments may be useful for process analysis or mining purposes, for example to assess if patterns of events occur during execution of process. Accordingly, the proposed concepts may be used in conjunction with existing process mining systems/methods.

FIG. 1 shows an embodiment of a system 100 for processing an event log according to an embodiment.

The system 100 comprises an interface component 110 adapted to obtain an event log, the event log comprising a log of event occurrences for an executed process. Here, the interface component 110 is adapted to configure to generate a process string 10 from a log 115 of event occurrences for the executed process. In the generated process string 10, the event occurrences are represented as words, and the ordering of the words in the string is representative of the order of the event occurrences for the executed process (as determined from the log 115 of event occurrences).

The log 115 of event occurrences for the executed process is communicated to the interface component 110 via a wired or wireless connection. By way of example, the wireless connection may comprise a short-to-medium-range communication link. For the avoidance of doubt, short-to-medium-range communication link may be taken to mean a short-range or medium-range communication link having a range of up to around one hundred (100) meters. In short-range communication links designed for very short communication distances, signals typically travel from a few centimeters to several meters, whereas, in medium-range communication links designed for short to medium communication distances, signals typically travel up to one hundred (10)0 meters. Examples of short-range wireless communication links are ANT+, Bluetooth, Bluetooth low energy, IEEE 802.15.4, ISA100a, Infrared (IrDA), Near Field Communication (NFC), RFID, 6LoWPAN, UWB, Wireless HART, Wireless HD, Wireless USB, ZigBee. Examples of medium-range communication links include Wi-Fi, ISM Band, Z-Wave. Here, the output signals are not encrypted for communication via the wired or wireless connection in a secured manner. However, it will be appreciated that, in other embodiment, one or more encryption techniques and/or one or more secure communication links may be employed for the communication of signals/data in the system.

The system 100 also comprises an identification component 120 adapted to identify repeating events in the event log. More specifically, in this example, the identification component 120 is adapted to employ conventional text processing/recognition techniques to identify repeated words in the string(s) of the event log 10. Furthermore, the identification component 120 is adapted to add a sequence identifier to each of the words representing the identified repeating events, wherein a sequence identifier is representative of a position in an occurrence sequence The system 100 further comprises a modelling component 122 that is adapted to obtain an events embedding model representative of relationships between a plurality of events of one or more processes. More specifically, the events embedding model comprises a vector representation of relationships between a plurality of events.

For this purpose, the modelling component 122 of the system 100 may communicate with one or more data processing resources available in the internet or "cloud" 50. Such data processing resources may undertake part or all of the processing required to obtain an events embedding model.

The events embedding model is provided to a clustering component 124 of the system 110. The motion determination component 124 is adapted to cluster the repeating events into one or more groups based on the events embedding model. More specifically, in this non-limiting example, the clustering component is configured to: cluster the identified repeating events into a plurality of groups; analyze the plurality of groups to identify an outlier to the plurality of groups; and remove the identified outlier from the plurality of groups.

For the clustering process, the clustering component 124 employs one or more conventional clustering techniques, such as a K-means algorithm for example. Such conventional clustering approaches are widely known in the field of data processing, and so it will be understood that the clustering component 124 may employ any such clustering concepts.

Further, in this non-limiting example, to identify an outlier, the clustering component 124 is configured to compare the number of members of a group with a threshold value, and to identify the group as an outlier based on comparison result.

Again, to undertake the clustering process, the clustering component 124 may communicate with one or more data processing resources available in the internet or "cloud" 50. Such data processing resources may undertake part or all of the processing required to cluster the repeating events and/or identify outliers.

Thus, it will be appreciated that the embodiment may employ distributed processing principles.

An association component 126 of the system is then configured to associate each of the one or more groups with a respective identifier.

The system 100 further comprises a log editor 128 that is adapted to, for each identified repeating event in the event log, replace the repeating event in the event log with the identifier associated with the group that the repeating event is a member of In this way, pre-processed (i.e. modified version) of the event log is provided wherein the repeated events detailed therein are less obfuscating. This refined or improved version of the event log may assist or facilitate process mining for example.

The system 100 is further adapted to generate an output signal 130 representative of the processed event log. In other words, processing the even log in accordance with a proposed embodiment, an output signal 130 representative of the processed (e.g. refined or improved) event log is generated.

The system further comprises a graphical user interface (GUI) 160 for providing information to one or more users. The output signal 130 is provided to the GUI 160 via wired or wireless connection. By way of example, the wireless connection may comprise a short-to-medium-range communication link. As indicated in FIG. 1, the output signal 130 is provided to the GUI 160 from the data processing unit 110. However, where the system, has made use of data processing resources via the internet or cloud 50), an output signal may be made available to the GUI 160 via the internet or cloud 50.

Based on the output signal 130, the GUI 160 is adapted to communicate information by displaying one or more graphical elements in a display area of the GUI 160. In this way, the system may communicate information about an event log that may be useful for analyzing the executed process. For example, the GUI 160 may be used to display graphical elements to a process engineer, data analyst, technician or the like.

From the above description of the embodiments of FIG. 1, it will be understood that there is proposed a system for processing an event log to maintain information about repeated events but reduce redundancy.

Also, from the above description, it will be understood that a proposed method according to an embodiment may comprise the following main stages: Obtain Event Log—for example, obtaining and construct an event log with events represented in an ordered event sequence (e.g. [A B C B D E B], [A B C B D B E B F B] . . . ; Identify and Cluster Repeated Events—for example, identify repeating events in the event log, add sequence identifier representing order of event occurrences (e.g. [A B1 C B2 D E B3], [A1 B4 C1 B5 D1 B6 E1 B7 F B8] . . . ), cluster events into groups based on an events embedding model (Group 1=[B1, B2, B8], Group 2=[B3, B4], Group 3=[B6, B7], and Group 4=[B5]). Also remove outlier group with only single member, i.e. Group 4 Replace Repeated Events with Group Identifier—for example, associate each group with a respective identifier (e.g. Group 1=B1, Group 2=B2, Group 3=B3) and, for each identified repeating event in the event log, replace with the identifier associated with the group that the repeating event is a member of (e.g. [A B1 C B1 D E B2], [A1 B2 C1 D1 B3 E1 B3 F B1] . . . ).

Figure 2:
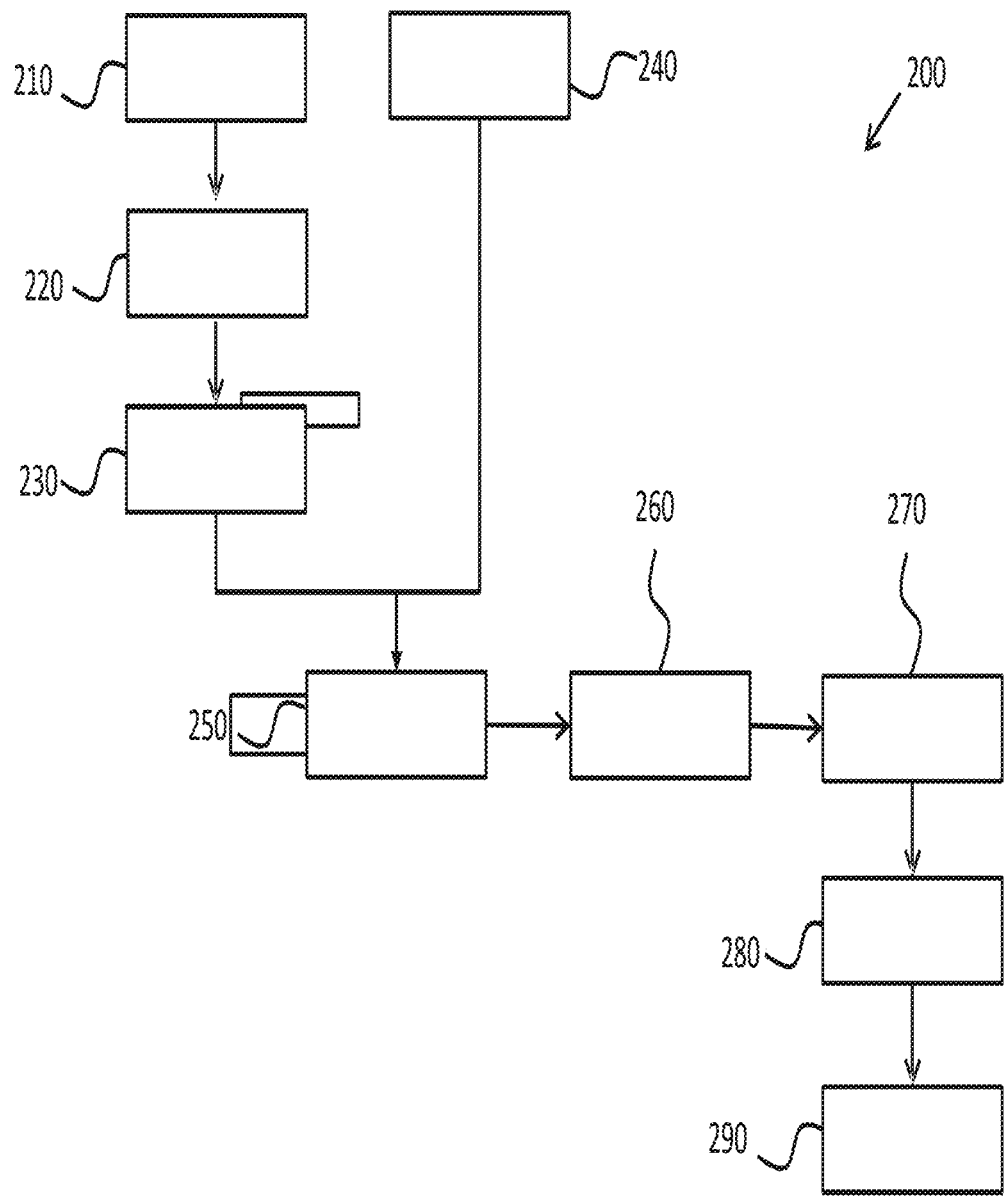
FIG. 2 is a flow diagram of a method of processing an event log according to an embodiment.

By way of example, a flow diagram of method of processing an event log according to an embodiment is depicted in FIG. 2.

Step 210 comprises obtaining an event log, wherein the event log comprises a log of event occurrences for an executed process. The log may, for example, be obtained from a server or remote processing system. By way of exemplifying the embodiment of FIG. 2, an example process log obtained may comprise the events A, B, C, D, and E executed in the following order: A, B, C, B, D, E, B, C, B, D, E, B.

Next, in step 220, a process string is generated from the event log, wherein event occurrences are represented as words. Further, the process string is generated such that the ordering of the words in the process string is representative of the order of the event occurrences. Accordingly, for the example process log obtained in step 210, step 220 generates the processing string "A B C B D E B C B D E B". Taking this approach a dataset comprising a plurality of event logs may be represented as N sentences, where N is the number of different event logs (or process traces).

In step 230, repeating events in the process string are identified and renamed. More specifically, in this exemplary embodiment, step 230 includes adding a sequence identifier to each of the words representing the identified repeating events, wherein a sequence identifier is representative of a position in an occurrence sequence, e.g., B to B1, B2, . . . , etc. Thus, for the example process log obtained in step 210, completion of step 230 results in the processing string from step 220 being converted to "A B1 C B2 D E B3 C B4 D E B5".

Step 240 comprises obtaining 240 an events embedding model representative of relationships between a plurality of events of one or more processes. More specifically, in this embodiment, the events embedding model comprises a vector representation of relationships between a plurality of events. Word embedding may be thought of as an approach to provide a dense vector representation of words that capture something about their meaning. This provides a representation of the events, where the use of "meaning" here refers to implicit relations between the events in one or more processes, e.g. events that surround an event. As a result, each event represents a point in an embedding spaces, and accompanied assumption is that events occurring in similar periods of a process will have similar meanings.

In step 250, based on the events embedding model, the repeating events are clustered into one or more groups, wherein each group comprises at least one of the identified repeating events. Here, the step 250 of clustering the repeating events comprises determining distances between the repeating events in the vector representation and then clustering the repeating events into one or more groups based on the determined distances. For instance, for the example process log obtained in step 210, the repeating events of B can be clustered as three groups: {B1, B2}, {B3} and {B4, B5} based on their embedding distance.

Next, step 260 comprises analyzing the plurality of groups to identify outlier groups and removing the identified outlier group(s). By way of example, step 260 of this embodiment comprises: comparing the number of members of a group with a threshold value; identifying the group as an outlier based on comparison result; and removing the identified outlier group(s) from the plurality of groups. For instance, for the example process log obtained in step 210, the second group {B3} is identified as an outlier (because it only has a single event) and removed.

Step 270 comprises associating each of the one or more groups with a respective identifier. In this way, identifiers (or labels) may be assigned to the groups. By way of example, the original word for an event may be used as (at least part of) the identifier for a group, e.g., the averaged vector or median vector. For instance, for the example process log obtained in step 210, the repeating events of the first group (namely B1 & B2) are now relabeled as B1 in the processing string, and the repeating events of the third group namely (B4 & B5) are now relabeled as B2.

Step 280 comprises, for each identified repeating event in the event log, replacing the repeating event with the identifier associated with the group that the repeating event is a member of. For instance, for the example process log obtained in step 210, the process string becomes: "A B1 C B1 D E C B2 D E B2" (wherein removed outliers are no longer labelled, i.e. removed from the process string).

It will therefore be appreciated that the exemplary method depicted in FIG. 2 processes an event log so as to remove reduce redundancy yet maintain information about the repeating events that may assist in identifying event patterns.

Although exemplary embodiments have been described above as employing particular components processes, it will be appreciated that variations to such components/processes may be employed in other embodiments.

For example, using a sequence identifier related to the sequence position in the process string is one option. The purpose of this is to relabel repeating events to distinguish different context (e.g., a blood test event have different meanings when it occurs at different phase of the clinical process). Other relabeling approaches may therefore be employed, including the following (e.g. where a "blood test" events appears tens of times during a patient's care journey):
Interval-based—e.g., relabel "blood test" as "blood test in the first hour", "blood test in the second hour", etc.
Closest clinical activity—e.g., "blood test before $1^{st}$ diagnosis", "blood test between $1^{st}$ and $2^{nd}$ diagnosis")
Based on Event Attribute Values:
Categorical: blood test normal, blood test abnormal
Binned: e.g., "blood test with WBC between 0-x1", "blood test with WBC between x1-x2" (x1, x2 are example white blood cell count intervals)

Figure 3:
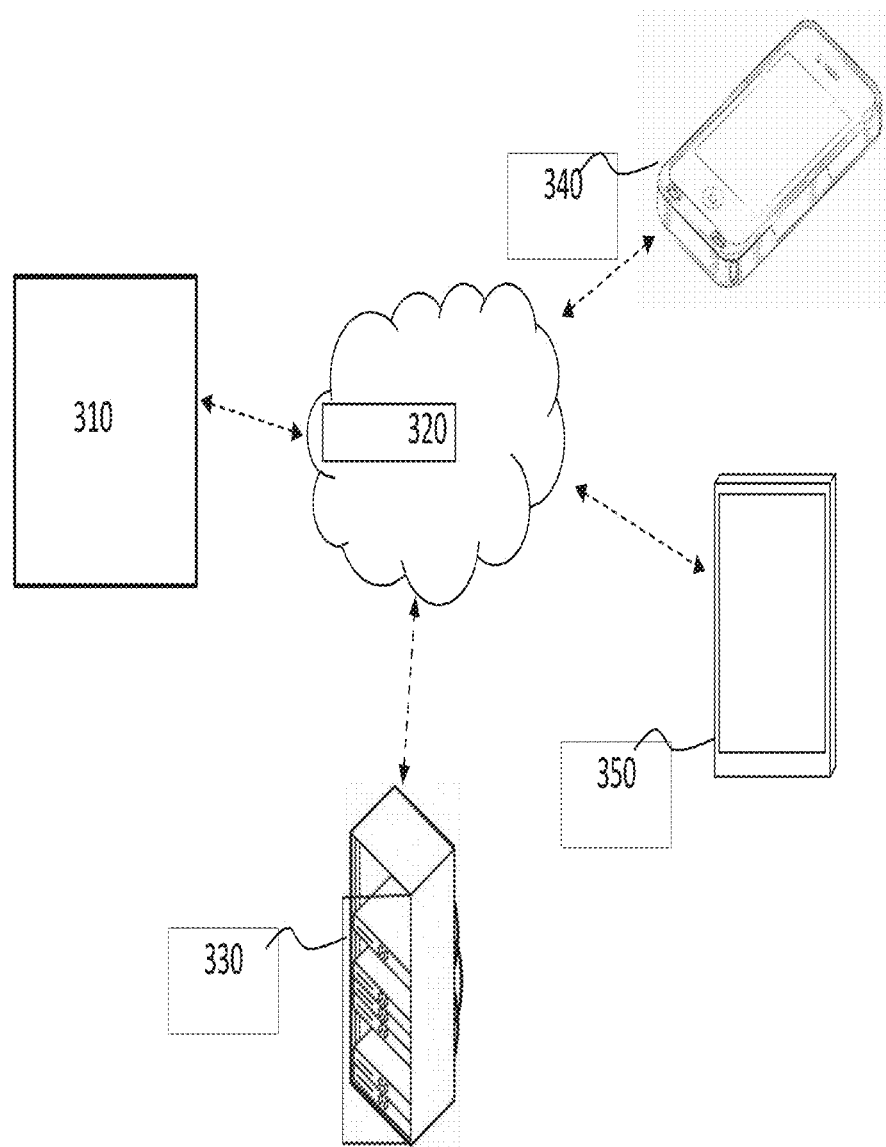
FIG. 3 is a simplified block diagram of a system according to another embodiment.

Referring now to FIG. 3, there is depicted another embodiment of a system according to the invention a process server 310. Here, the process server 310 communicates output signals representative of an event log for an executed process via the internet 320 (using a wired or wireless connection for example) to a remotely located system 330 for processing an event log.

The system 330 is adapted to receive the event log from the server 310. The system is also adapted to obtain an events embedding model representative of relationships between a plurality of events of the executed process (e.g. from a local or remote database and/or via a user input interface).

The system 330 processes the sever output signals and the events embedding model in accordance with a method according to a proposed embodiment to generate a modified (e.g. refined) event log. More specifically, the method: identifies repeating events in the event log; clusters the repeating events into one or more groups (based on the events embedding model); associates each of the one or more groups with a respective identifier; and, for each identified repeating event in the event log, replaces the repeating event in the event log with the identifier associated with the group that the repeating event is a member of.

The system 330 is further adapted to generate output signals representative of the modified event log. Thus, the system 330 provides a centrally accessible processing resource that can receive an event log from a remote process server and run one or more algorithms to process the event log. Information relating to the detected processed event log can be stored by the system (for example, in a database) and provided to other components of the system. Such provision of processed event log may be undertaken in response to a receiving a request (via the internet 820 for example) and/or may be undertaken without request (i.e. 'pushed').

For the purpose of receiving information about a processed event log from the system 330, and thus to enable the processed event log to analyzed or mined, the system further comprises first 340 and second 350 mobile computing devices.

Here, the first mobile computing device 340 is a mobile telephone device (such as a smartphone) with a display for displaying graphical elements representative of a processed event log. The second mobile computing device 350 is a mobile computer such as a Laptop or Tablet computer with a display for displaying graphical elements representative of a processed event log.

The system 330 is adapted to communicate output signals to the first 340 and second 350 mobile computing devices via the internet 320 (using a wired or wireless connection for example). As mentioned above, this may be undertaken in response to receiving a request from the first 340 or second 350 mobile computing devices.

Based on the received output signals, the first 340 and second 350 mobile computing devices are adapted to display one or more graphical elements in a display area provided by their respective display. For this purpose, the first 340 and second 350 mobile computing devices each comprise a software application for processing, decrypting and/or interpreting received output signals in order to determine how to display graphical elements. Thus, the first 340 and second 350 mobile computing devices each comprise a processing arrangement adapted to one or more values representative of an event log that has been processed in accordance with a proposed embodiment, and to generate a display control signal for modifying at least one of the size, shape, position, orientation, pulsation or color of the graphical element.

The system can therefore communicate information about of a processed event log to users of the first 340 and second 350 mobile computing devices. For example, each of the first 340 and second 350 mobile computing devices may be used to display graphical elements to a process engineer, technician or data analyst.

Implementations of the system of FIG. 12 may vary between: (i) a situation where the system 330 communicates display-ready data, which may for example comprise display data including graphical elements (e.g. in JPEG or other image formats) that are simply displayed to a user of a mobile computing device using conventional image or webpage display (which can be web based browser etc.); to (ii) a situation where the system 330 communicates raw data set information that the receiving mobile computing device then uses to process an event log, and then displays graphical elements based on the processed event log (for example, using local software running on the mobile computing device). Of course, in other implementations, the processing may be shared between the system 330 and a receiving mobile computing device such that part of the data generated at system 330 is sent to the mobile computing device for further processing by local dedicated software of the mobile computing device. Embodiments may therefore employ server-side processing, client-side processing, or any combination thereof.

Further, where the system 330 does not 'push' information (e.g. output signals), but rather communicates information in response to receiving a request, the user of a device making such a request may be required to confirm or authenticate their identity and/or security credentials in order for the information to be communicated.

Figure 4:
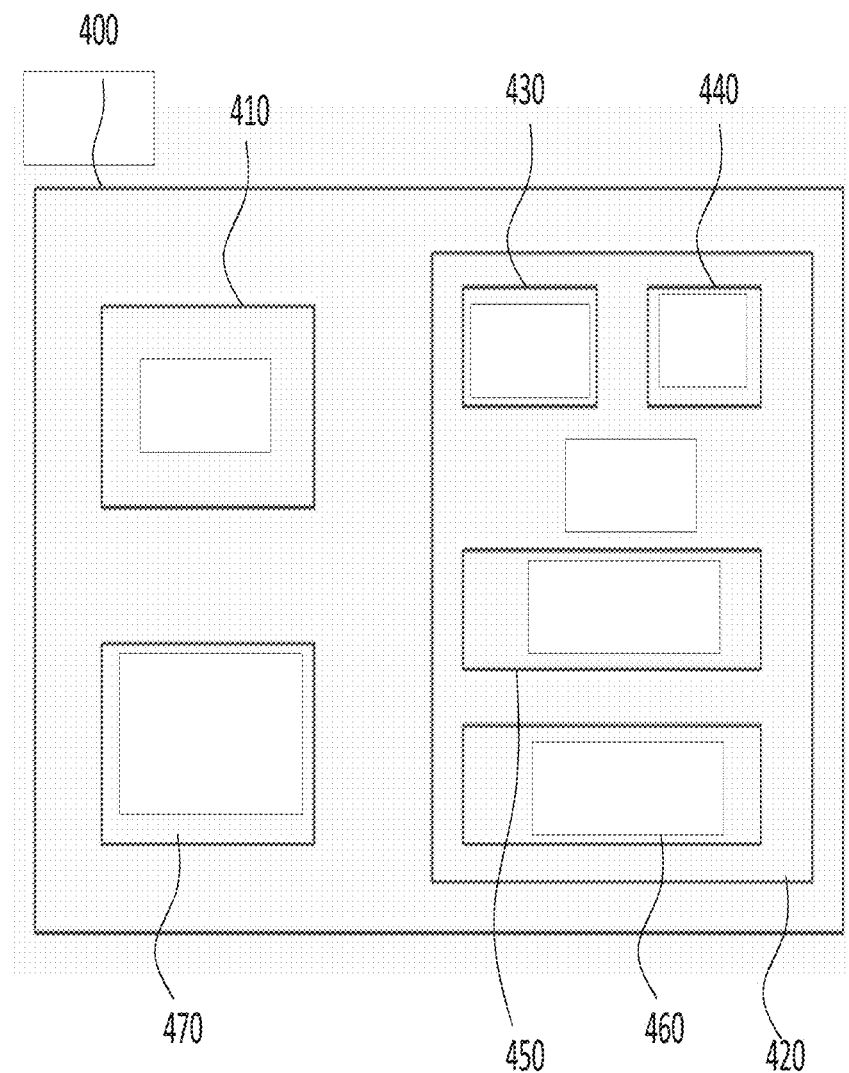
FIG. 4 is a simplified block diagram of a computer within which one or more parts of an embodiment may be employed.

FIG. 4 illustrates an example of a computer 400 within which one or more parts of an embodiment may be employed. Various operations discussed above may utilize the capabilities of the computer 400. For example, one or more parts of a system for detecting subject motion may be incorporated in any element, module, application, and/or component discussed herein.

The computer 400 includes, but is not limited to, PCs, workstations, laptops, PDAs, palm devices, servers, storages, and the like. Generally, in terms of hardware architecture, the computer 400 may include one or more processors 410, memory 420, and one or more I/O devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a digital signal processor (DSP), or an auxiliary processor among several processors associated with the computer 400, and the processor 410 may be a semiconductor based microprocessor (in the form of a microchip) or a microprocessor.

The memory 420 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and one or more applications 460 in accordance with exemplary embodiments. As illustrated, the application 460 comprises numerous functional components for implementing the features and operations of the exemplary embodiments. The application 460 of the computer 400 may represent various applications, computational units, logic, functional units, processes, operations, virtual entities, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

Application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, php. Python, ASP scripts, FORTRAN, COBOL, Perl, Java, ADA, .NET, and the like.

The I/O devices 470 may include input devices such as, for example but not limited to, a mouse, keyboard, scanner, microphone, camera, etc. Furthermore, the I/O devices 470 may also include output devices, for example but not limited to a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 460 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, optimized for embedded implementation, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it will be appreciated that embodiments may therefore be useful for reducing redundancy of repeating events in an event log. Event logs processed in accordance with a proposed embodiment may make process analysis easier and/or more effective.

The description has been presented for purposes of illustration and description, and is not intended to be exhaustive or limited to the invention in the form disclosed. Many modifications and variations will be apparent to those of ordinary skill in the art. Embodiments have been chosen and described in order to best explain principles of proposed embodiments, practical application(s), and to enable others of ordinary skill in the art to understand that various embodiments with various modifications are contemplated.

The invention claimed is:

1. A method of processing an event log, the method comprising:
    obtaining an event log by generating a process string, wherein the event log comprises a log of event occurrences for an executed process, the event occurrences are represented as words, and the ordering of the words in the string is representative of the order of the event occurrences;
    identifying repeating events in the event log by adding a sequence identifier to each of the words representing the identified repeating events, wherein a sequence identifier is representative of a position in an occurrence sequence;
    obtaining an events embedding model representative of relationships between a plurality of events of one or more processes;
    based on the events embedding model, clustering the repeating events into one or more groups, each group comprising at least one of the identified repeating events;
    associating each of the one or more groups with a respective identifier; and
    for each identified repeating event in the event log, replacing the repeating event in the event log with the identifier associated with the group that the repeating event is a member of.

2. The method of claim 1, wherein clustering the identified repeating events into one or more groups comprises:
    clustering the identified repeating events into a plurality of groups;
    analyzing the plurality of groups to identify an outlier to the plurality of groups; and
    removing the identified outlier from the plurality of groups.

3. The method of claim 2, wherein analyzing the plurality of groups to identify an outlier to the plurality of groups comprises:
    comparing the number of members of a group with a threshold value; and
    identifying the group as an outlier based on comparison result.

4. The method of claim 1, wherein the one or more processes comprise the executed process.

5. The method of claim 1, wherein the events embedding model comprises a vector representation of relationships between a plurality of events.

6. The method of claim 5, wherein clustering the repeating events into one or more groups comprises:
    determining distances between the repeating events in the vector representation; and
    clustering the repeating events into one or more groups based on the determined distances.

7. A computer program product for processing an event log, wherein the computer program product comprises a computer-readable storage medium having computer-readable program code embodied therewith, the computer-readable program code:
    obtains an event log by generating a process string, wherein the event log comprises a log of event occurrences for an executed process, the event occurrences are represented as words, and the ordering of the words in the string is representative of the order of the event occurrences;

identifies repeating events in the event log by adding a sequence identifier to each of the words representing the identified repeating events, wherein a sequence identifier is representative of a position in an occurrence sequence;

obtains an events embedding model representative of relationships between a plurality of events of one or more processes;

based on the events embedding model, clusters the repeating events into one or more groups, each group comprising at least one of the identified repeating events;

associates each of the one or more groups with a respective identifier; and for each identified repeating event in the event log, replaces the repeating event in the event log with the identifier associated with the group that the repeating event is a member of.

8. A system comprising at least one processor and a computer program product for processing an event log, wherein the computer program product comprises a computer-readable storage medium having computer-readable program code embodied therewith, the computer-readable program code:

obtains an event log by generating a process string, wherein the event log comprises a log of event occurrences for an executed process, the event occurrences are represented as words, and the ordering of the words in the string is representative of the order of the event occurrences;

identifies repeating events in the event log by adding a sequence identifier to each of the words representing the identified repeating events, wherein a sequence identifier is representative of a position in an occurrence sequence;

obtains an events embedding model representative of relationships between a plurality of events of one or more processes;

based on the events embedding model, clusters the repeating events into one or more groups, each group comprising at least one of the identified repeating events;

associates each of the one or more groups with a respective identifier; and for each identified repeating event in the event log, replaces the repeating event in the event log with the identifier associated with the group that the repeating event is a member of.

9. A system for processing an event log, the system comprising a processor, wherein the processor comprises:

an interface component that obtains an event log by generating a process string, wherein the event log comprises a log of event occurrences for an executed process, the event occurrences are represented as words, and the ordering of the words in the string is representative of the order of the event occurences;

an identification component that identifies repeating events in the event log by adding a sequence identifier to each of the words representing the identified repeating events, wherein a sequence identifier is representative of a position in an occurrence sequence;

a modelling component that obtains an events embedding model representative of relationships between a plurality of events of one or more processes;

a clustering component based on the events embedding model, that clusters the repeating events into one or more groups, each group comprising at least one of the identified repeating events;

an association component that associates each of the one or more groups with a respective identifier; and a log editor, for each identified repeating event in the event log, that replaces the repeating event in the event log with the identifier associated with the group that the repeating event is a member of.

10. The system of claim 9, wherein the clustering component is configured to:

clustering the identified repeating events into a plurality of groups;

analyze the plurality of groups to identify an outlier to the plurality of groups; and remove the identified outlier from the plurality of groups.

11. The system of claim 10, wherein clustering component compares the number of members of a group with a threshold value, and to identify the group as an outlier based on comparison result.

12. The system of claim 9, wherein the events embedding model comprises a vector representation of relationships between a plurality of events, and wherein the clustering component:

determines distances between the repeating events in the vector representation; and clusters the repeating events into one or more groups based on the determined distances.

* * * * *